US012566968B1

(12) United States Patent
Kallurupalli et al.

(10) Patent No.: US 12,566,968 B1
(45) Date of Patent: Mar. 3, 2026

(54) MEMORY CONTEXT FOR LARGE LANGUAGE MODEL CLASSIFICATION OVERRIDE

(71) Applicant: Intuit Inc., Mountain View, CA (US)

(72) Inventors: Kumar Kallurupalli, Mountain View, CA (US); Jeremy Scott Krohn, Reno (CA); Narendra Babu, Mountain View, CA (US); Na Xu, San Jose, CA (US); Byron Tang, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/271,709

(22) Filed: Jul. 16, 2025

(51) Int. Cl.
  *G06N 3/0895* (2023.01)
(52) U.S. Cl.
  CPC ................................. *G06N 3/0895* (2023.01)
(58) Field of Classification Search
  None
  See application file for complete search history.

(56) References Cited

U.S. PATENT DOCUMENTS

2020/0103746 A1*  4/2020  Huang ................ G03F 7/70158
2025/0232117 A1*  7/2025  Sun .......................... G06F 40/35
2025/0267003 A1*  8/2025  Harshberger ......... H04L 9/3221

OTHER PUBLICATIONS

Liu, Tiantian, et al. "Mitigating privacy risks in LLM embeddings from embedding inversion." arXiv preprint arXiv:2411.05034 (2024). (Year: 2024).*
Wang, Weizhi, et al. "Augmenting language models with long-term memory." Advances in Neural Information Processing Systems 36 (2023): 74530-74543. (Year: 2023).*

* cited by examiner

*Primary Examiner* — Eric Nilsson
(74) *Attorney, Agent, or Firm* — Lathrop GPM LLP

(57) ABSTRACT

Memory context for large language model classification override performing operations including obtaining a document and initiating processing the document through a shared large language model to generate an LLM classification in a set of classifications. The operations further include processing the document through an embedding generation model to generate a value embedding for the document, comparing the value embedding with stored value embeddings for a user, and overriding, in the set of classifications, the LLM classification with a stored value classification when a corresponding stored embedding in the stored embeddings matches the value embedding. The operations further include updating a data repository with the set of classifications.

20 Claims, 4 Drawing Sheets

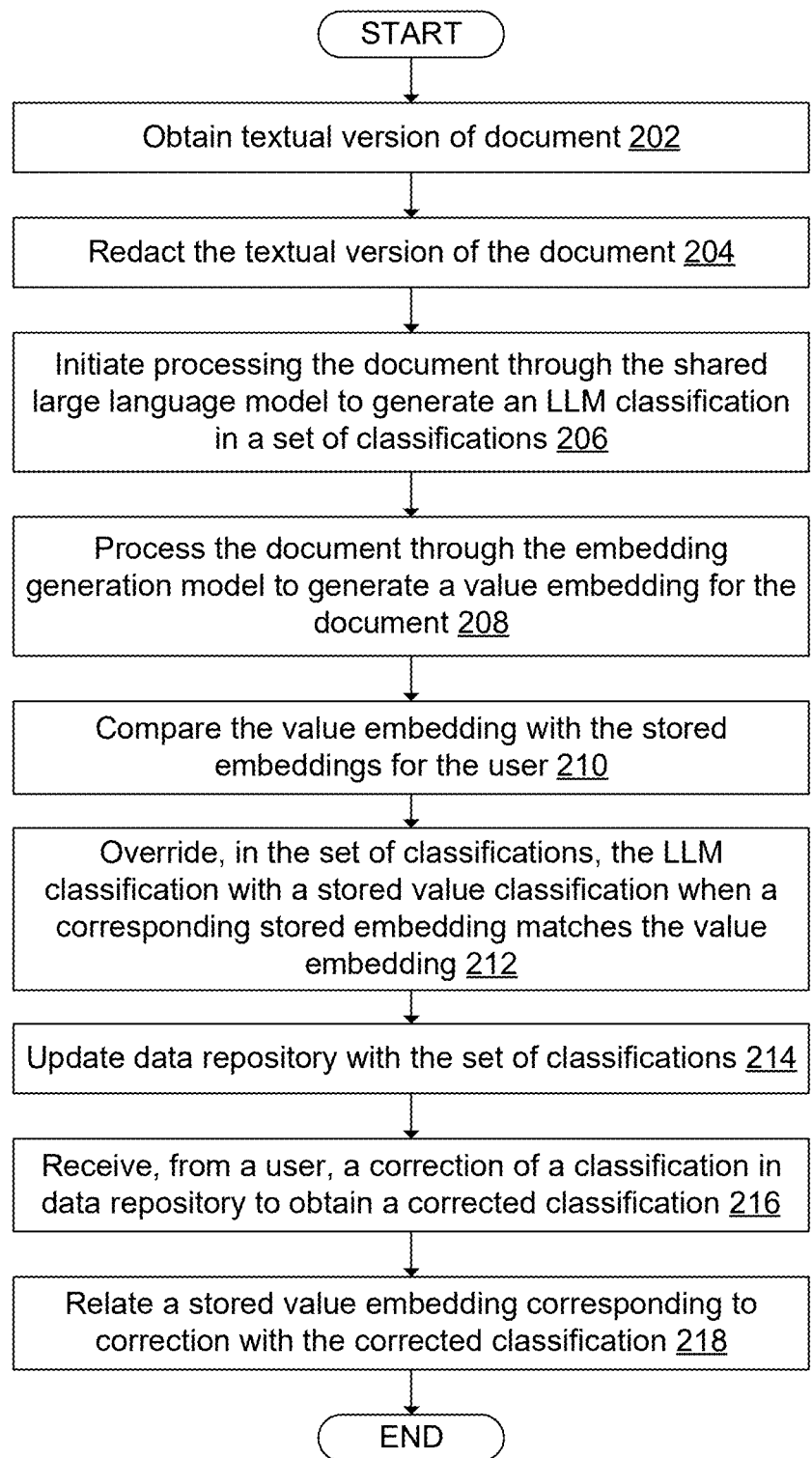

START

Obtain textual version of document 202

Redact the textual version of the document 204

Initiate processing the document through the shared large language model to generate an LLM classification in a set of classifications 206

Process the document through the embedding generation model to generate a value embedding for the document 208

Compare the value embedding with the stored embeddings for the user 210

Override, in the set of classifications, the LLM classification with a stored value classification when a corresponding stored embedding matches the value embedding 212

Update data repository with the set of classifications 214

Receive, from a user, a correction of a classification in data repository to obtain a corrected classification 216

Relate a stored value embedding corresponding to correction with the corrected classification 218

END

*FIG. 2*

400
Computing
System

412
Output Device(s)

404
Non-Persistent
Storage

402
Computer
Processor(s)

406
Persistent
Storage

408
Communication
Interface

410
Input Device(s)

420
Network

422
Node X

● ● ●

424
Node Y

426
Client Device

MEMORY CONTEXT FOR LARGE LANGUAGE MODEL CLASSIFICATION OVERRIDE

BACKGROUND

Large Language Models (LLMs) are generally trained models that are trained to perform a variety of tasks. Each of the variety of tasks may be performed for a multitude of different users. Each user may have their own customizations and requirements. Because of the size of the LLM, resource usage constraints prohibit each user and each task from having an individual LLM. Further, customizing an LLM via further fine tuning is a resource intensive process that is expensive, and, in some cases, cannot be performed because of the LLM model being obscured. Namely, having a separate LLM for each user has too high of a memory requirement.

One area in which LLMs are used is to perform classification for documents. Classification may be performed at two levels. In a first level, the classification is for the document as a whole. In a second level, the classification is for individual entities identified in the document. The classification relates the values to entities to which the values represent (i.e., data extraction). When LLMs are used for either level of classifications, the LLM may be incorrect for the particular user. Thus, the user may apply a correction to the output of the LLM. Because the LLM is not specific to the user, the correction that the user applies has to be reapplied to a subsequent classification of the same type. Namely, the LLM cannot learn for a particular user.

SUMMARY

In general, in one aspect, one or more embodiments relate to a method that includes obtaining a document and initiating processing the document through a shared large language model to generate an LLM classification in a set of classifications. The method further includes processing the document through an embedding generation model to generate a value embedding for the document, comparing the value embedding with stored value embeddings for a user, and overriding, in the set of classifications, the LLM classification with a stored value classification when a corresponding stored embedding in the stored embeddings matches the value embedding. The method further includes updating a data repository with the set of classifications.

In general, in one aspect, one or more embodiments relate to a computer system that includes a computer processor, a shared large language model executing on the computer processor for processing a document to generate an LLM classification in a set of classifications, and an embedding generation model for executing on the computer processor for processing the document to generate a value embedding for the document. The method further includes a classification unit executing on the computer processor for comparing the value embedding with a plurality of stored value embeddings for a user, overriding, in the set of classifications, the LLM classification with a stored value classification when a corresponding stored embedding in the plurality of stored embeddings matches the value embedding, and updating a data repository with the set of classifications.

Other aspects of one or more embodiments will be apparent from the following description and the appended claims.

BRIEF DESCRIPTION OF DRAWINGS

FIG. 2 shows a flowchart for performing document classification, in accordance with one or more embodiments.

Like elements in the various figures are denoted by like reference numerals for consistency.

DETAILED DESCRIPTION

Figure 1:
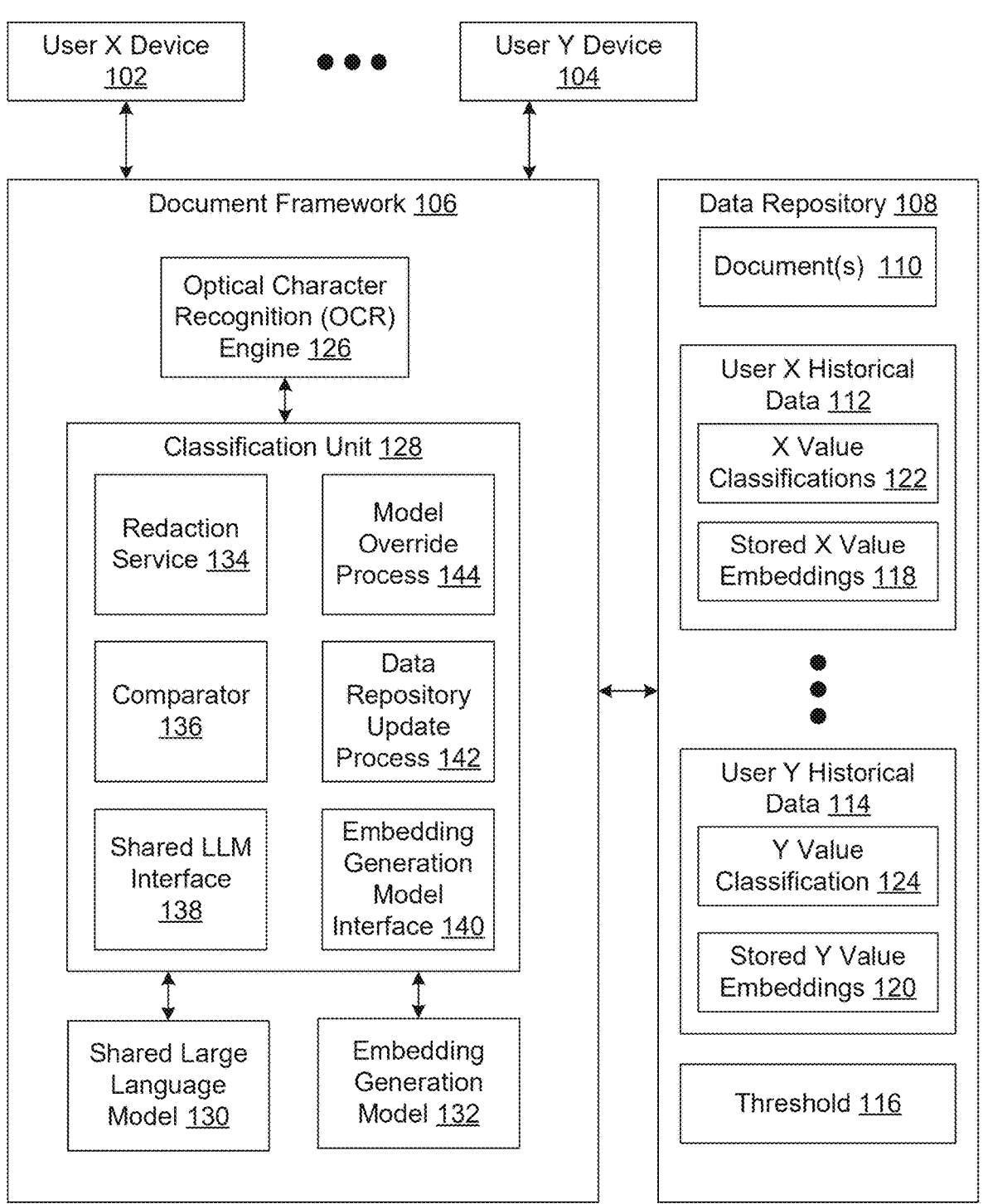
FIG. 1 shows a schematic diagram of a system, in accordance with one or more embodiments, in accordance with one or more embodiments.

One or more embodiments are directed to a machine learning framework that addresses the problem of a large language model (LLM) being too large to provide for user customizations during classification tasks of documents. More particularly, one or more embodiments add a memory context to the machine learning framework. The memory context provides for overriding the decision of the LLM during the classification task based on past decisions of the user.

To add the memory context, a dual pipeline approach is used. The LLM is on a first side of the pipeline and performs a classification task in relation to a new document. The second side of the pipeline uses an embedding model to generate embeddings of values of a previous document (i.e., historical documents) that have already been classified for the particular user. The embedding model further generates vector embeddings from one or more values in the new document. The vector embeddings of the previous document are compared against the vector embeddings of the new document. If the vector embeddings match, then the classification provided by the LLM is overridden with the previous classification of the matching vector embedding.

In the present application, the classification tasks refer to one or more levels of classification that may be applied to a document. The first level of classification is the document classification as a whole. The document classification identifies the type of document as a whole based on the contents in the document. For example, the document classification task may be whether the document is a receipt, an invoice, a certificate, report, letter, manuscript, or other document type. Another level may be to classify individual sections of a document. For example, a financial report may have separate sections for cash flow, balance sheet, income statements, etc., which are each classified using embodiments described herein.

Another level of a classification task is document content extraction. Document content extraction is the process by which content is extracted from documents for indexing and storage. In indexing or storage systems, content is stored as key identifier, key value pairs whereby a key value is related to the key identifier. Individual terms (e.g., words, phrases, or other collection of text) in the document that are extrapolated from the document are the key values. The key identifier is the identifier describing what the corresponding key value represents. The key identifier may be explicitly in the document or may be interpreted from the document based on surrounding context. By way of an example, a document that is a form often has field identifiers, field descriptions, and a place for a person to enter a field value (e.g., "1. First Name of Applicant:" followed by a blank box for the user). The field identifier (e.g., "1." in the detailed example) may not be descriptive. The field description (e.g., "First Name of Applicant:" in the detailed example) may not match the key identifier in storage (e.g., the field description is a longer human readable description whereas storage uses a normalized description, such as "AppFirstName"). However, the field description may be indicative of the key identifier. The field value (e.g., what the user enters in the blank box) may be stored directly as the key value or normalized and stored as a key value. Thus, in the document content extraction, the classification task in document content extraction is classifying an extracted key value into one of the classes of key identifiers.

One or more embodiments provide for LLM override across the different levels of classification tasks. Turning to the Figures, FIG. 1 shows a schematic diagram of a system, in accordance with one or more embodiments. The user device (e.g., user X device (102), user Y device (104)) is a computing system used by a corresponding user. The user may have one or more computing devices. For example, the user device may be a computing system described in reference to FIG. 4A and FIG. 4B.

Each user may have a corresponding set of user data in the data repository (108) and corresponding documents. Further, each user may have corresponding specific classifications that the user applies. Many or most of the classifications between users may be overlapping. However, some of the classifications may be user dependent. For example, the classification may be into a customized class that the user defined for the user's documents. As another example, the classification may be a correction or a modification that the particular user makes. For example, for some users, a piano may be a home expense, but for a pianist, the piano is classified as a work expense. Thus, the classification itself is user customized.

The user device (e.g., user X device (102), user Y device (104)) is connected to a document framework (106). The document framework (106) is connected to a data repository (108). In general, a data repository (108) is a type of storage unit or device (e.g., a file system, database, data structure, or any other storage mechanism) for storing data. The data repository (108) may include multiple different, potentially heterogeneous, storage units and/or devices.

The data repository (108) includes functionality to store documents (110), user historical data (e.g., user X historical data (112), user Y historical data (114)), and at least one threshold (116). Documents are files having human readable information. The document may be a structured document or an unstructured document. A structured document is a set of information where the formatting, number, and layout are static across document instances of the same type of document from the same entity. For example, a structured document may be a form with boxes for users to enter text. Examples of structured documents include financial forms, student and employment application forms, reporting forms, and other such documents. An unstructured document is a document that has unstructured text. For example, an unstructured document may be an academic paper, a biography, a webpage on a website, or other type of freeform document.

A document may be stored as an image version or a textual version of the document. The image version of the document is a document image. In a document image, at least a portion of the characters (e.g., alphanumeric, or symbolic) in the document are stored in image form (e.g., as pixel information) rather than as a character encoding. The document image is the state of the document prior to optical character recognition (OCR) processing. In one or more embodiments, the document is any type of document that includes characters.

User historical data (e.g., user X historical data (112), user Y historical data (114)) is data from past automated or manual classifications. Historical means any time prior to the current classification task. The past automated or manual classifications may be a classification that is corrected by or explicitly or implicitly approved by the corresponding user. Each user may have corresponding user historical data (e.g., user X historical data (112), user Y historical data (114)).

User historical data includes stored value embeddings (e.g., stored X value embeddings (118), stored Y value embeddings (120)) related to value classifications (e.g., X value classification (122), Y value classification (124)). For example, a one-to-one correspondence may exist between the value embedding and value classification. The value embedding is a vector embedding of the corresponding value extracted from the document. The value embedding is dependent on the classification level. For example, the value embedding may be for the document as a whole (i.e., the document is the value for which the classification is performed), a term in the document (i.e., the term is the value for which the classification is performed), or other collection of terms from the document. The value classification is the class assigned to the corresponding value. The class may be the document type, the key identifier, or other class depending on the level of classification task.

The threshold (116) is a threshold on the degree of similarity that the value embedding from a new document has as compared to the stored value embedding. The threshold (116) is a numerical value and may be dependent on the classification task or user.

Continuing with FIG. 1, the document framework (106) is configured to perform classification tasks for documents. The document framework includes an OCR engine (126), a classification unit (128), a shared LLM (130), and an embedding generation model (132). The OCR engine (126) is software that recognizes individual characters from the document image to generate OCR output (not shown). The OCR output is a set of bounding boxes and encoded characters in the bounding boxes. The OCR output include relationships between characters in a document. For example, the OCR output may include information that certain text is together.

The shared LLM (130) and the embedding generation model (132) are machine learning models. The machine learning models used by the system (100) may include neural networks and may operate using one or more layers of weights that may be sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. Different types of machine learning algorithms may be used, including regression, decision trees, random forests, support vector machines, clustering, classifiers, principal component analysis, gradient boosting, etc.

The machine learning models may be trained by inputting training data to a machine learning model to generate training outputs that are compared to expected outputs. For supervised training, the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

The shared LLM (130) is a machine learning model having a deep neural network architecture, typically based on transformer models. LLMs are trained on large-scale textual datasets to learn statistical patterns in natural language. LLMs may be configured to perform one or more natural language processing tasks, including but not limited to text generation, summarization, translation, and question answering, by generating contextually relevant outputs based on input sequences. Examples of LLMs include CHATGPT®, ANTHROPIC AI'S CLAUDE®, META'S LLAMA®, etc.

The shared LLM (130) is shared in that multiple users, each with its own set of historical data and potentially with its own customizations have classifications performed by the same shared LLM (130). For example, the LLM (130) may be shared across a collection or all users. The LLM may be a generally trained LLM or a specifically trained LLM that is specifically trained to perform classification tasks, albeit for a wide collection of users.

The embedding generation model (132) is configured to generate value embeddings for documents. Specifically, the embedding generation model (132) may be configured to generate a vector embedding as the value embedding from one or more values in the document. The embedding generation model (132) is a machine learning model that is configured to convert text, images, or audio into numbers. The embedding generation model may be MiniLM, Hugging Face, Global Vectors for Word Representation (GloVe), Generative Pre-trained Transformer (GPT) model, Bidirectional encoder representations from transformers (BERT), or other model that generates vector embeddings. In one or more embodiments, the embedding generation model (132) is a lightweight model.

The classification unit (128) is software that is configured to manage the classification task and determine the classification for a document. The classification unit includes a redaction service (134), a comparator (136), a shared LLM interface (138), an embedding generation model interface (140), a model override process (144), and a data repository update process (142). The redaction service (134) is configured to redact portions of a document based on sensitive information. For example, the redaction service (134) may perform rule based redactions. As another example, the redaction service (134) may be configured to perform regular expression based redactions.

The comparator (136) is software that is configured to compare value embeddings for new documents with stored value embeddings. In particular, the comparator (136) is configured to identify the user, obtain historical data for the user, search the historical data for stored value embeddings that match the value embeddings of a new document.

The shared LLM interface (138) is software that is configured to interface with the shared LLM (130). In particular, the shared LLM interface (138) is configured to generate an LLM prompt for a particular document. The LLM prompt includes the document or a link to the document. The LLM prompt further includes one or more instructions requesting the classification of one or more values in the document.

The embedding generation model interface (140) is software that is configured to send the document or values within the document to the embedding generation model (132). The sending of the document or the values by the embedding generation model interface (140) triggers the embedding generation model (132) to generate vector embeddings for the document.

The model override process (144) is software configured to obtain the result of the comparator and initiate the override of the shared LLM (130) classification based on the result. For example, the model override process (144) may be configured to identify the corresponding class to the matching value embedding and override all or a portion of the LLM classification based on the matching value embedding.

The data repository update process (142) is configured to update the data repository (142) based on the classification. The updates may be to the classification as well as to the historical data for future classification tasks.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart for performing document classification, in accordance with one or more embodiments. The method of FIG. 2 may be implemented using the system of FIG. 1 and one or more of the steps may be performed on or received at one or more computer processors. While the various steps in this flowchart are presented and described sequentially, at least some of the steps may be executed in different orders, may be combined or omitted, and at least some of the steps may be executed in parallel. Furthermore, the steps may be performed actively or passively.

Turning to FIG. 2, Block 202 includes obtaining a textual version of a document. For example, a user may submit a document or a link to a document. As another example, the document may be obtained as part of batch processing of a set of documents. To obtain the textual version of the document, optical character recognition on an image version of the document may be performed. The output of the OCR engine may include text and corresponding bounding boxes of the text. Although FIG. 2 describes performing classification based on the textual version of the document, the classification may be performed on the image version or another multimedia version of the document.

Block 204 includes redacting the textual version of the document. The textual version of the document may be redacted to remove sensitive data. The redaction may be performed based on matching regular expressions, keyword matching or other matching. Redactions may also be performed to remove data that generally changes between documents for the same user (i.e., document dependent data). For example, numerical amounts that are expected to change may be redacted. The redactions may be performed by masking portions of text.

Block 206 includes initiating the processing of the document through the shared large language model to generate an LLM classification in a set of classifications. The shared LLM is prompted, with a prompt defined by the system, to perform at least one classification task on the document. The prompt may include the raw document, the document after the OCR processing, or the redacted version of the document. The shared LLM performs natural language processing on the document to generate the set of classifications. The set of classifications may include a single classification that identifies the document type of the document or may include multiple classifications based that includes key value pairs or other information extracted from the document.

Block 208 includes processing the document through the embedding generation model to generate a value embedding for the document. The embedding generation model may process the redacted version of the document. The embedding generation model may generate a value embedding for the document as a whole by processing the OCR extracted text from the document. As another example, the embedding generation model may create multiple embeddings for each of different text blocks extracted in the OCR extraction. If multiple embeddings are extracted, then the processing described below may be performed independently for each of the multiple embeddings to perform separate memory overriding.

Block 210 includes comparing the value embedding with the stored value embeddings for the user. A threshold number of embeddings may be obtained from the data repository. For example, the previous hundred classifications or corrections of the user may be used for the comparison with the current embeddings. In the example, the stored embeddings corresponding to the previous hundred classifications or corrections are obtained from the data repository. The value embedding may be individually compared with each embedding in the set of embeddings. In one or more embodiments, the comparison is performed using a cosine similarity function. A predefined threshold may be applied to determine whether the embedding is a match.

Block 212 includes overriding, in the set of classifications, the LLM classification with a stored value classification when a corresponding stored embedding matches the value embedding. When a matching stored value embedding is found based on the comparison in Block 210, the corresponding classification is obtained. In one or more embodiments, when multiple matching stored value embeddings are found, each corresponding classification is obtained. Then, a determination is made whether a consensus exists amongst the corresponding classification. A consensus may be a most frequently classification or that each of the classifications are identical. If a consensus exists, then the LLM classification is overridden. If the consensus does not exist, then the LLM classification may remain.

Block 214 includes updating a data repository with the set of classifications. The set of classifications including the overridden classification is transmitted to the data repository for storage. The set of classifications may also be populated in a user interface and displayed to the user. Further processing may be performed as described below so as to continue to update the user historical data.

Block 216 includes receiving, from a user, a correction of a classification in a data repository to obtain a corrected classification. For example, the user may correct the overridden classification or the LLM classification.

Block 218 includes relating a stored value embedding corresponding to a correction with the corrected classification. If the correction is received, the corresponding stored value embedding is obtained. The stored value embedding is then related to the corrected classification. In some embodiments, all classifications regardless of user correction are used to update the historical data of the user. In some embodiments, only the classifications that the user has reviewed and either explicitly or implicitly approved are used to update the historical data of the user.

The processing of FIG. 2 shows how memory context that is specific to the user may be used to override classifications of a shared LLM thereby overcoming a problem of LLMs being too large and resource intensive to be specific to a user.

Figure 3:
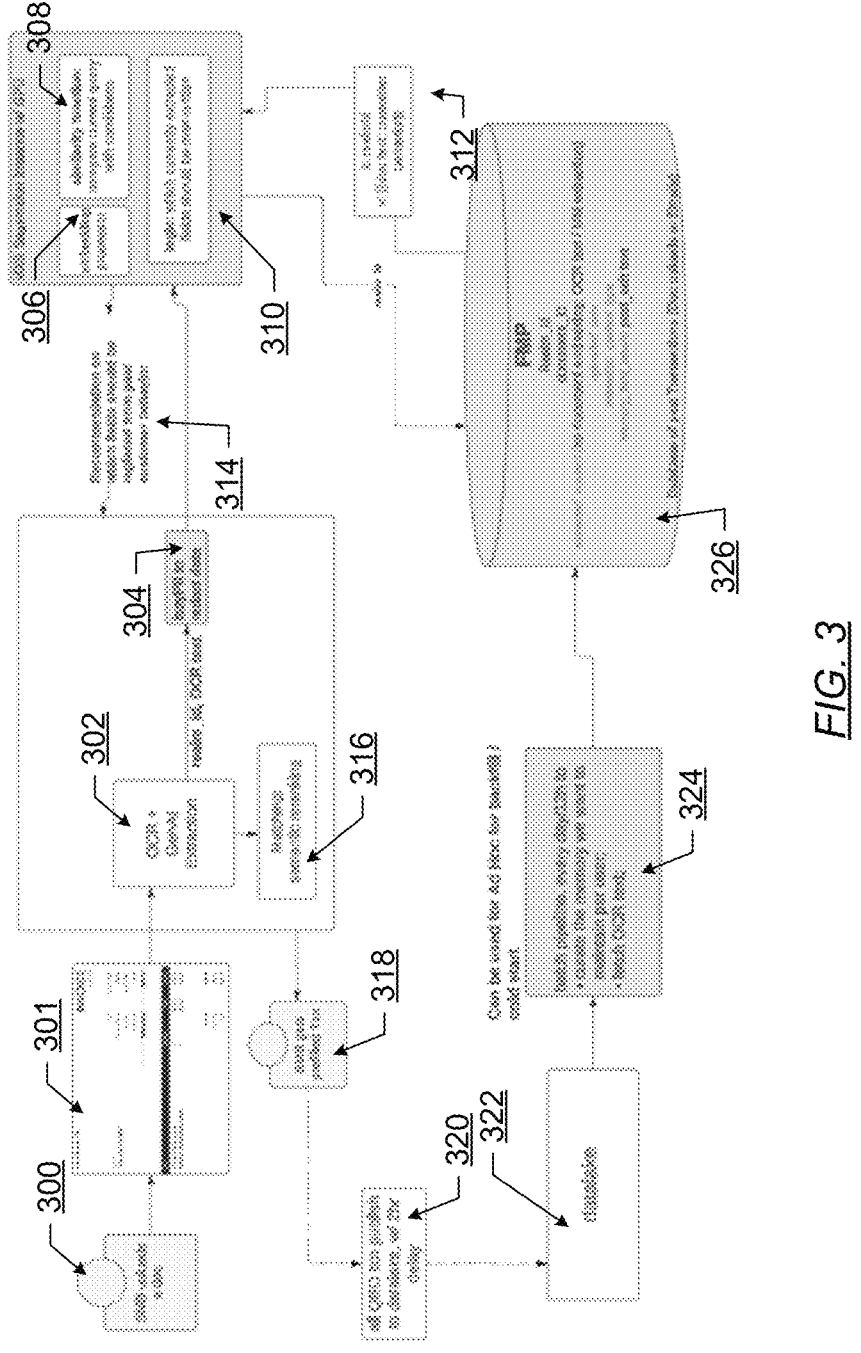
FIG. 3 shows an example of processing an invoice for a small business, in accordance with one or more embodiments.

The following example is for explanatory purposes only and not intended to limit the scope of one or more embodiments. FIG. 3 shows an example of processing an invoice for a small business, in accordance with one or more embodiments. The small business (i.e., a user) uploads a document (300) that is an invoice (301). OCR extraction extracts text from the document. IspyPII (304) then redacts highly sensitive information. An embedding processor (306) generates MiniLM embeddings for the redacted OCR text in the example. Then, a similarity function (308) compares the current MiniLM embeddings with historical document embeddings (312) stored in a database. In one or more embodiments, only a subset of the historical document embeddings is used. For example, the subset may be the immediately preceding one hundred matches. Memory override logic (310) applies memory overrides in the form of the recommendations (314) to the generative AI extraction process (302) when a similarity match is found.

Based on the extraction and the override, a matching process is performed to match the invoice to a transaction (316). The small business may then get prefilled transaction record, which is also published as data (320) to the user's account in a datalake (322). The stored data may then be batch processed (324) in a database update. The batch processing curates which vendor names and information to save on a per user basis and stores the information in an FMP database (326). Specifically, the vendor names after editing by a user and the embedding of the current document are written to the database.

An example implementation is described below. For OCR extraction and historical data storage the following operations may be performed. Using AMAZON WEB SERVICES (AWS) TEXTRACT® extraction software, the system extracts text (OCR) from incoming invoices. The extraction software may be used to provides accurate extraction of textual data from various document formats. Each processed document's OCR text and the user-reviewed vendor name are stored in a historical dataset hosted on DYNAMODB® database to have fast retrieval. Fast retrieval is useful for the online processing of invoices. Alongside the OCR text, the system generates and stores sentence-level embeddings using the MiniLM model in DynamoDB, enabling quick access during similarity assessments.

The redaction or document masking may be performed through regular expression matching. Targeted sections of the OCR that are not pertinent to matching invoice documents from the same vendor may be used. For example, invoice line items, such as item descriptions, quantities, and prices, are systematically filtered out. The filtering enhances the effectiveness of the similarity matching process, as these details can vary significantly between invoices from the same vendor, thus potentially leading to incorrect similarity assessments.

To perform the similarity assessment and matching to existing invoices, upon receiving a new invoice, the text is immediately processed through Textract for OCR extraction as described above. Embedding generation is then performed using the MiniLM model. The embedding of the newly processed invoice is compared against stored embeddings in the DynamoDB using cosine similarity. A predefined threshold 't' (e.g., 0.85) for cosine similarity may be used to identify historical invoices that show high similarity with the new invoice. Documents surpassing the predefined threshold may be considered significant matches.

The example implementation may use consensus-based vendor selection. From the identified matches, the system may consider up to 'k' documents with the highest cosine similarity scores. The system may then aggregate the vendor names tied to these top-k similar documents to find a consensus. The consensus is identified as the most frequently cited vendor name from these documents. This consensus-derived vendor name is proposed and auto-filled in the vendor field of the new invoice, facilitating user verification and reducing manual data entry.

After selection by the document framework, interaction with the user and learning of the document framework based on the interaction may be performed. For example, Users can review the auto-filled vendor name and make corrections if necessary. Any user corrections are then used to update the historical records, both the OCR text and the amended vendor name are stored in DynamoDB. The updates enrich the historical dataset, continually enhancing the system's learning and the system's future prediction accuracy. The parameters may be tuned weekly to deliver the most accurate recommendations.

For the MiniLM, pretraining may be performed on masked OCR data. To ensure the embeddings are pretrained for the specific purpose of matching documents from the same vendor, a hierarchical vendor context modeling approach may be used. The hierarchical vendor context modeling approach involves creating comprehensive vendor profile embeddings that capture key attributes such as common invoicing styles, frequently used terms, and historical classification patterns. The training process utilizes both individual invoice features and aggregated vendor-level context, allowing MiniLM to learn not only from the text of the invoices but also from broader trends associated with each vendor. Thus, the embedding generation model is pretrained for each possible class in the classification.

One or more embodiments balance document storage to improve learning. Document storage may be improved to enhance the memory context techniques described above by balancing the retention of mistaken documents and accurate documents. For mistaken documents, embodiments capture instances where classification and extraction errors occurred, allowing the system to learn from user corrections and refine its predictions. For accurate documents, correctly processed documents are stored to reinforce reliable patterns and successful classification strategies.

As shown in the example, invoice processing is streamlined by reducing manual data entries, LLM extraction, and minimizing errors. Thus, the user experience is also improved through a more efficient document management process. The use of DynamoDB for storing OCR and embeddings ensures that the retrieval operations are swift and scalable, suitable for real-time processing needs.

As shown, by storing history from a particular user, one or more embodiments learn from user behavior without the proliferation of individual user models that need to be frequently retrained. Further, use of a consensus-based selection function for robust vendor predictions, tuning, and specifics of the configuration parameters such as history length, similarity threshold, and top N matches assist in the memory context classification.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 4A:
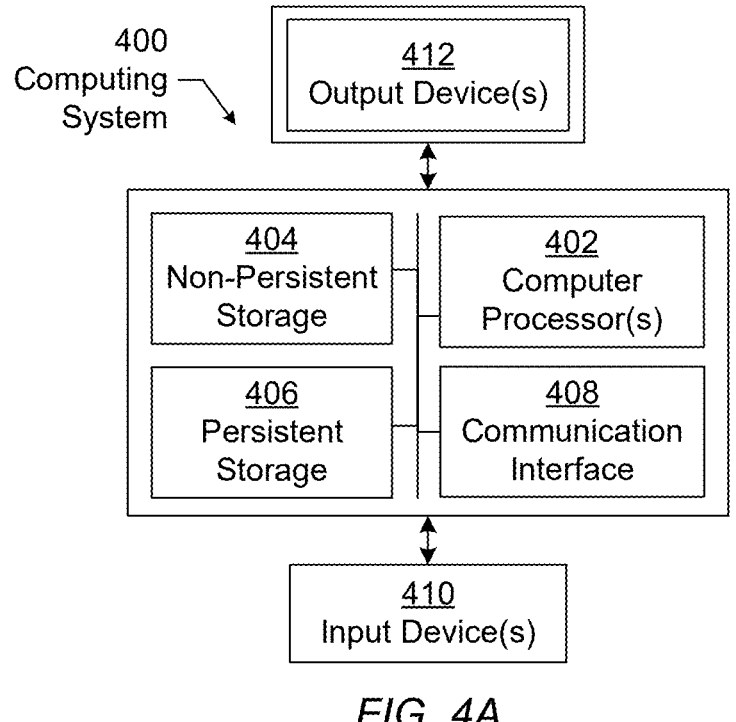
FIGS. 4A and 4B show an example of a computing system, in accordance with one or more embodiments.

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores, or micro-cores, of a processor. The computer processor(s) (402) includes one or more processors. The computer processor(s) (402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400), in accordance with one or more embodiments. The communication interface (408) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (412) may include a display device, a printer, external storage, or any other output device. One or more of the output device(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

Figure 4B:
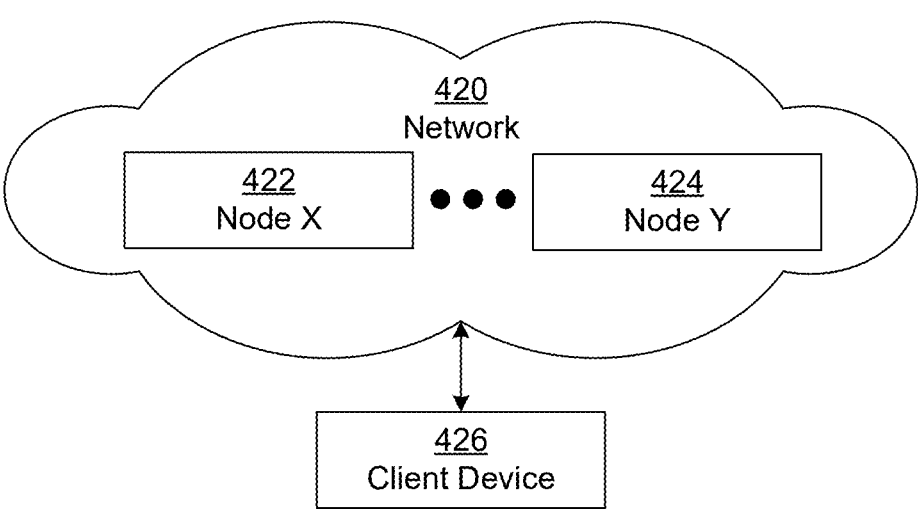

The computing system (400) in FIG. 4A may be connected to, or be a part of, a network. For example, as shown in FIG. 4B, the network (420) may include multiple nodes (e.g., node X (422) and node Y (424), as well as extant intervening nodes between node X (422) and node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422) and node Y (424)) in the network (420) may be configured to provide services for a client device (426). The services may include receiving requests and transmitting responses to the client device (426). For example, the nodes may be part of a cloud computing system. The client device (426) may be a computing system, such as the computing system shown in FIG. 4A. Further, the client device (426) may include or perform all or a portion of one or more embodiments.

The computing system of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
obtaining a document for a user of a plurality of users;
initiating processing the document through a shared large language model (LLM) to generate an LLM classification in a set of classifications, wherein the shared LLM is shared amongst the plurality of users;
receiving the LLM classification of the document from the shared LLM;
processing the document through an embedding generation model to generate a value embedding for the document;
comparing the value embedding with a plurality of stored value embeddings that is specific to the user;
overriding, in the set of classifications, the LLM classification with a stored value classification that is related to a corresponding stored embedding when the corresponding stored embedding in the plurality of stored embeddings matches the value embedding; and
updating a data repository with the set of classifications.

2. The method of claim 1, further comprising:
performing optical character recognition on an image version of a document to obtain a textual version of the document, wherein the textual version of the document is classified.

3. The method of claim 1, further comprising:
redacting, prior to processing the document through the embedding generation model, the textual version of the document to remove sensitive data.

4. The method of claim 1, further comprising:
redacting, prior to processing the document through the embedding generation model, the textual version of the document to remove document dependent data.

5. The method of claim 1, wherein the set of classifications is a single classification of the document that identifies a document type of the document.

6. The method of claim 1, wherein the set of classifications relates each individual key value in the document to a corresponding key identifier of the key value.

7. The method of claim 1, further comprising:
determining that two or more of the plurality of stored value embeddings matches the value embedding; and determining that a consensus exists amongst the stored value classification for each of the two or more of the plurality of stored value embeddings, wherein overriding is responsive to determining that the consensus exists.

8. The method of claim 7, wherein the consensus exists when the stored value classification is a most frequent classification corresponding to each of the two or more of the plurality of stored value embeddings.

9. The method of claim 1, further comprising:

receiving, from a user, a correction of a classification in data repository to obtain a corrected classification; and relating a stored value embedding corresponding to correction with the corrected classification.

10. The method of claim 1, further comprising:

pretraining the embedding generation model for each possible class in the classification using a plurality of redacted documents for a plurality of users.

11. A computer system comprising:

a computer processor;

a shared large language model shared amongst a plurality of users executing on the computer processor for:

processing a document to generate an LLM classification in a set of classifications, wherein the document is for a user of the plurality of users;

an embedding generation model for executing on the computer processor for:

processing the document to generate a value embedding for the document;

a classification unit executing on the computer processor for:

receiving the LLM classification of the document from the shared LLM, comparing the value embedding with a plurality of stored value embeddings that is specific to the user, overriding, in the set of classifications, the LLM classification with a stored value classification that is related to a corresponding stored embedding when the corresponding stored embedding in the plurality of stored embeddings matches the value embedding, and updating a data repository with the set of classifications.

12. The computer system of claim 11, further comprising:

an optical character recognition (OCR) engine configured to perform OCR on an image version of a document to obtain a textual version of the document, wherein the textual version of the document is classified.

13. The computer system of claim 11, further comprising:

a redaction service for redacting, prior to processing the document through the embedding generation model, the textual version of the document to remove sensitive data.

14. The computer system of claim 11, further comprising:

a redaction service for redacting, prior to processing the document through the embedding generation model, the textual version of the document to remove document dependent data.

15. The computer system of claim 11, wherein the set of classifications is a single classification of the document that identifies a document type of the document.

16. The computer system of claim 11, wherein the set of classifications relates each individual key value in the document to a corresponding key identifier of the key value.

17. The computer system of claim 11, wherein the classification unit is further for:

determining that two or more of the plurality of stored value embeddings matches the value embedding; and determining that a consensus exists amongst the stored value classification for each of the two or more of the plurality of stored value embeddings, wherein overriding is responsive to determining that the consensus exists.

18. The computer system of claim 17, wherein the consensus exists when the stored value classification is a most frequent classification corresponding to each of the two or more of the plurality of stored value embeddings.

19. The computer system of claim 17, wherein the classification unit is further for:

receiving, from a user, a correction of a classification in data repository to obtain a corrected classification; and relating a stored value embedding corresponding to correction with the corrected classification.

20. The computer system of claim 17, wherein the classification unit is further for:

pretraining the embedding generation model for each possible class in the classification using a plurality of redacted documents for a plurality of users.

* * * * *